United States Patent
Noumura

(10) Patent No.: US 9,719,443 B2
(45) Date of Patent: Aug. 1, 2017

(54) VEHICLE CONTROL SYSTEM AND VEHICLE CONTROL METHOD

(75) Inventor: Shin Noumura, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 13/515,406

(22) PCT Filed: Dec. 17, 2010

(86) PCT No.: PCT/IB2010/003283
§ 371 (c)(1),
(2), (4) Date: Jun. 12, 2012

(87) PCT Pub. No.: WO2011/073786
PCT Pub. Date: Jun. 23, 2011

(65) Prior Publication Data
US 2012/0303231 A1    Nov. 29, 2012

(30) Foreign Application Priority Data

Dec. 17, 2009    (JP) .................................. 2009-286956

(51) Int. Cl.
*G06F 7/70*    (2006.01)
*G06F 19/00*    (2011.01)
(Continued)

(52) U.S. Cl.
CPC ............ *F02D 41/10* (2013.01); *F02D 11/105* (2013.01); *F02D 41/045* (2013.01); *B60W 10/06* (2013.01);
(Continued)

(58) Field of Classification Search
None
See application file for complete search history.

(56) References Cited

U.S. PATENT DOCUMENTS 5,623,906 A * 4/1997 Storhok ................... 123/406.23
6,006,724 A * 12/1999 Takahashi ............. F02D 11/105
123/339.19
(Continued)

FOREIGN PATENT DOCUMENTS

JP    A-63-025342    2/1988
JP    A-10-151965    6/1998
(Continued)

OTHER PUBLICATIONS

Jun. 15, 2011 International Search Report issued in International Patent Application No. PCT/IB2010/003283.
(Continued)

*Primary Examiner* — Lail Kleinman
(74) *Attorney, Agent, or Firm* — Oliff PLC

(57) ABSTRACT

A vehicle control system includes an acceleration generating device (engine, T/M) that generates an acceleration applied to a vehicle, and a vehicle control device that controls the acceleration generating device, based on an accelerator pedal stroke representing an operation of an accelerator pedal by a driver, and a vehicle speed of the vehicle. In the vehicle control system or method, the vehicle control device controls the acceleration generating device, based on a required acceleration that is determined based on a relationship between the accelerator pedal stroke and the required acceleration, including, as a condition, an acceleration corresponding to a given accelerator pedal stroke, which is specified by a relationship between the vehicle speed and the acceleration when the accelerator pedal stroke is held at the given value.

7 Claims, 9 Drawing Sheets

(51) Int. Cl.
*G06G 7/00* (2006.01)
*G06G 7/76* (2006.01)
*G06G 7/70* (2006.01)
*F02D 41/10* (2006.01)
*F02D 11/10* (2006.01)
*F02D 41/04* (2006.01)
*B60W 10/06* (2006.01)
*B60W 30/188* (2012.01)
*B60W 50/10* (2012.01)
*F02D 41/08* (2006.01)

(52) U.S. Cl.
CPC ......... *B60W 30/1882* (2013.01); *B60W 50/10* (2013.01); *F02D 41/08* (2013.01); *F02D 2200/501* (2013.01); *F02D 2250/18* (2013.01)

(56) References Cited

U.S. PATENT DOCUMENTS 6,440,041 B1 * 8/2002 Riedle et al. ............... 477/107
6,859,711 B2 * 2/2005 Eckert et al. ............... 701/70
2003/0060961 A1 * 3/2003 Ishizu et al. ............... 701/93

FOREIGN PATENT DOCUMENTS

| | | |
|---|---|---|
| JP | A-2008-037152 | 2/2008 |
| JP | A-2008-120183 | 5/2008 |
| JP | A-2008-254600 | 10/2008 |
| JP | A-2009-057874 | 3/2009 |
| JP | A-2009-057875 | 3/2009 |
| JP | A-2009-083542 | 4/2009 |
| JP | A-2010-215171 | 9/2010 |

OTHER PUBLICATIONS

Jun. 15, 2011 Written Opinion issued in International Patent Application No. PCT/IB2010/003283.

* cited by examiner

VEHICLE CONTROL SYSTEM AND VEHICLE CONTROL METHOD

The disclosure of Japanese Patent Application no. 2009-286956 filed on Dec. 17, 2009, including the specification, drawings and abstract is incorporated herein by reference in its entirety.

BACKGROUND OF THE INVENTION

1. Field of the Invention

The invention relates to a vehicle control system and a vehicle control method.

2. Description of the Related Art

In recent years, vehicle control called "torque demand control" is performed under which a target acceleration as an acceleration requested by the driver is determined based on a vehicle speed of the vehicle, and an accelerating operation amount (accelerator pedal stroke, pedal effort, etc.) at the time when the driver operates an accelerator pedal, and the throttle opening, fuel injection amount, ignition timing, etc. of the engine are controlled based on the target acceleration thus determined, as described in, for example, Japanese Patent Application Publication No. 63-025342 (JP-A-63-025342). While the target acceleration is determined based on the vehicle speed and the accelerating operation amount under the known torque demand control, the determined target acceleration, which is based on the senses of expert evaluators, provides a poor ground for achieving high-quality acceleration performance or acceleration feeling that is favorable for any driver, and it is thus difficult to design the optimum target acceleration.

Some examples of the torque demand control utilize the Weber-Fechner's law, as described in, for example, Japanese Patent Application Publication No. 2008-254600 (JP-A-2008-254600), Japanese Patent Application Publication No. 2009-057874 (JP-A-2009-057874), Japanese Patent Application Publication No. 2009-057875 (JP-A-2009-057875) and Japanese Patent Application Publication No. 2009-083542 (JP-A-2009-083542). According to the Weber-Fechner's law, "the quantity of human perception is proportional to the logarithm of the physical quantity of stimulus applied thereto". In the torque demand control utilizing the Weber-Fechner's law, a required value is determined based on the vehicle speed, the accelerating operation amount, and an exponential function utilizing the Weber-Fechner's law, and output control of the engine, etc. is performed based on the required value. In the known torque demand control as described above, the acceleration drops at a higher rate as the vehicle speed increases, or it takes much time to reach a steady-state condition with the same accelerating operation amount, resulting in an increase of the vehicle speed, whereby the driver may feel uncomfortable.

With the torque demand control utilizing the Weber-Fechner's law, too, it is difficult to design the optimum target acceleration in relation to the driver's accelerating operation amount, and the control is not sufficient to achieve an acceleration that meets or agrees with the sensibility of the driver, thus leaving room for improvement.

SUMMARY OF THE INVENTION

The invention has been developed in view of the above situations, and provides vehicle control system and vehicle control method which make it possible to sufficiently achieve an acceleration that meets the driver's sensibility, by determining the optimum required value in relation to the driver's accelerating operation amount.

According to one aspect of the invention, there is provided a vehicle control system including an acceleration generating device that generates an acceleration applied to a vehicle, and a vehicle control device that controls the acceleration generating device, based on an accelerating operation amount representing an operation of an accelerator pedal by a driver, and a vehicle speed of the vehicle, wherein the vehicle control device controls the acceleration generating device, based on a required value corresponding to the acceleration, which is determined based on a relationship between the accelerating operation amount and the required value, which relationship includes, as a condition, an acceleration corresponding to a given accelerating operation amount, which is specified by a relationship between the vehicle speed and the acceleration when the accelerating operation amount is held at the given accelerating operation amount.

In the vehicle control system as described above, it is preferable that the relationship between the accelerating operation amount and the required value includes, as a further condition, a minimum acceleration as an acceleration applied to the vehicle when an idling turns from ON to OFF.

In the vehicle control system as described above, it is preferable that the minimum acceleration applied when the idling turns from ON to OFF is a minimum generable acceleration as the acceleration that can be generated by the acceleration generating device when the idling turns from ON to OFF.

In the vehicle control system as described above, it is preferable that the minimum acceleration applied to the vehicle when the idling is. ON is determined according to the vehicle speed.

In the vehicle control system as described above, when the accelerating operation amount is in a region that is larger than at least the given accelerating operation amount, the relationship between the accelerating operation amount and the required value preferably includes, as a further condition, a maximum generable acceleration as the acceleration that can be generated by the acceleration generating device when the accelerating operation amount is equal to a maximum value.

In the vehicle control system as described above, it is preferable that the required value at the time when the accelerating operation amount is equal to the maximum value corresponds to the maximum generable acceleration.

According to another aspect of the invention, there is provided a vehicle control system including an acceleration generating device that generates an acceleration applied to a vehicle, and a vehicle control device that controls the acceleration generating device, based on an accelerating operation amount representing an operation of an accelerator pedal by a driver, and a vehicle speed of the vehicle, wherein the vehicle control device controls the acceleration generating device, based on a relationship between the accelerating operation amount and a required value corresponding to the acceleration, which relationship is a combination of a line indicative of a relationship between the accelerating operation amount and the required value, including an acceleration corresponding to a given accelerating operation amount, which is specified by a relationship between the vehicle speed and the acceleration when the accelerating operation amount is held at the given accelerating operation amount, and a line indicative of a relationship between the accelerating operation amount and the required value, including a maximum generable acceleration as the acceleration that can be generated by the acceleration generating device when the accelerating operation amount is equal to a maximum value.

According to a further aspect of the invention, there is provided a vehicle control method for controlling an acceleration generating device that generates an acceleration applied to a vehicle, based on an accelerating operation amount representing an operation of an accelerator pedal by a driver, and a vehicle speed of the vehicle, wherein the acceleration generating device is controlled, based on a required value corresponding to the acceleration, which is determined based on a relationship between the accelerating operation amount and the required value, which relationship includes, as a condition, an acceleration corresponding to a given accelerating operation amount, which is specified by a relationship between the vehicle speed and the acceleration when the accelerating operation amount is held at the given accelerating operation amount.

In the vehicle control system and vehicle control method as described above, the relationship between the accelerating operation amount and the required value includes, as a condition, the relationship between the vehicle speed and the acceleration when the accelerating operation amount is held at a given value, thus making it possible to design the acceleration applied to the vehicle in the direction of the vehicle speed when the accelerating operation amount is held at the given value. Accordingly, an acceleration that meets or agrees with the driver's sensibility can be sufficiently achieved by determining the optimum required value in relation to the driver's accelerating operation amount.

Also, in the vehicle control system according to the invention, when the driver's accelerating operation amount is in a region larger than at least the given accelerating operation amount, the relationship between the accelerating operation amount and the required value includes, as a further condition, the maximum generable acceleration. Therefore, in the region where the accelerating operation amount is large, a difference between the acceleration applied to the vehicle and the acceleration that can be generated by the acceleration generating device, at the same accelerating operation amount, is less likely to be increased or prevented from being increased. It is thus possible to sufficiently achieve an acceleration that meets the sensibility of the driver, by taking account of the maximum generable acceleration.

In the vehicle control system according to the invention, the required value at the time when the accelerating operation amount is equal to the maximum value is determined or set to a value corresponding to the maximum generable acceleration that can be generated when the accelerating operation amount is equal to the maximum value. As a result, the maximum generable acceleration is generated to be applied to the vehicle, thus assuring the maximum output of the acceleration generating device, while providing an advantageous effect of sufficiently achieving an acceleration that meets the sensibility of the driver.

In the vehicle control system according to the invention, the minimum acceleration applied to the vehicle when the idling turns from ON to OFF is set to the minimum generable acceleration; therefore, driving force for running the vehicle can be generated immediately after the accelerator pedal is depressed (i.e., placed in the ON position). Accordingly, the continuity of the driving force when the accelerator pedal is operated from the OFF position to the ON position can be ensured, so that the acceleration applied to the vehicle changes continuously, thus assuring smooth starting or re-accelerating of the vehicle.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

One embodiment of the invention will be described in detail with reference to the drawings. It is to be understood that the invention is not limited to the embodiment as described below. It is also to be understood that constituent elements of the following embodiment include those that can be easily conceived by those skilled in the art, or those substantially identical with the elements of the embodiment. Also, the acceleration mentioned in the following embodiment includes not only the acceleration as measured in a direction in which the vehicle is accelerated, but also the acceleration as measured in a direction in which the vehicle is decelerated.

Figure 1:
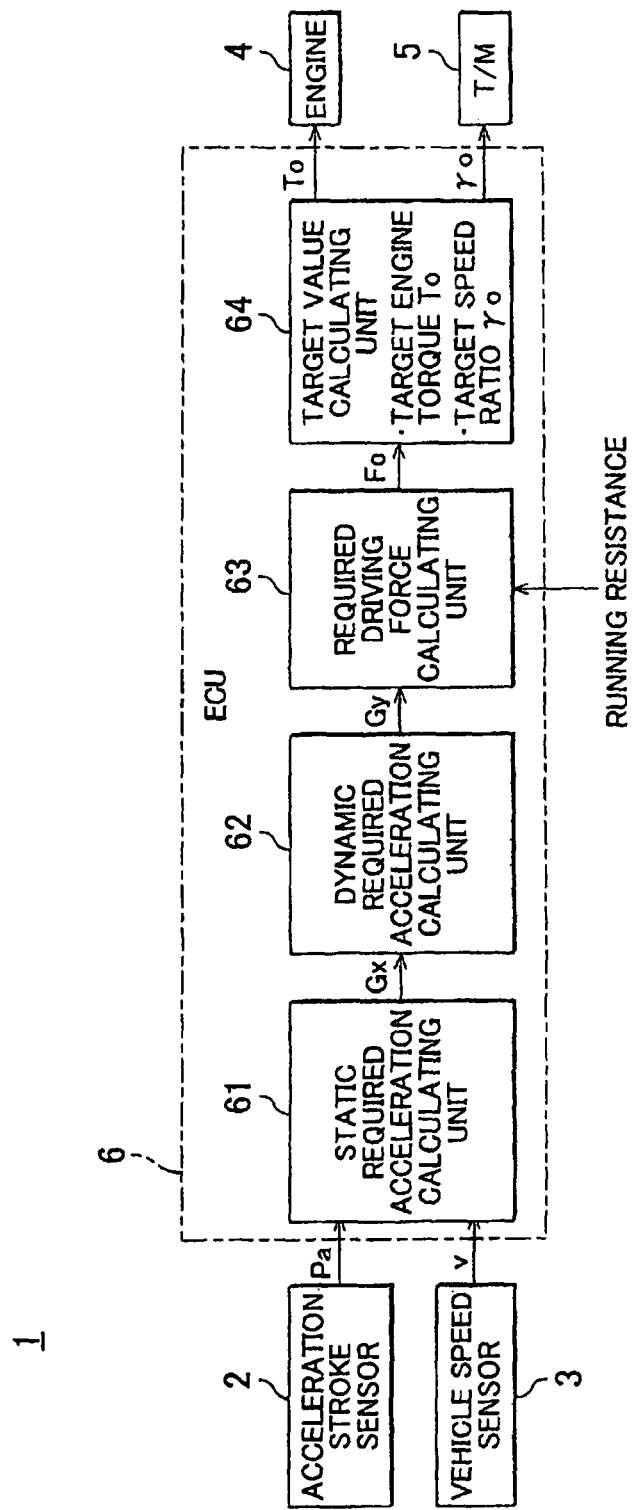
FIG. 1 is a view schematically showing the construction or arrangement of a vehicle control system according to one embodiment of the invention.
Figure 2:
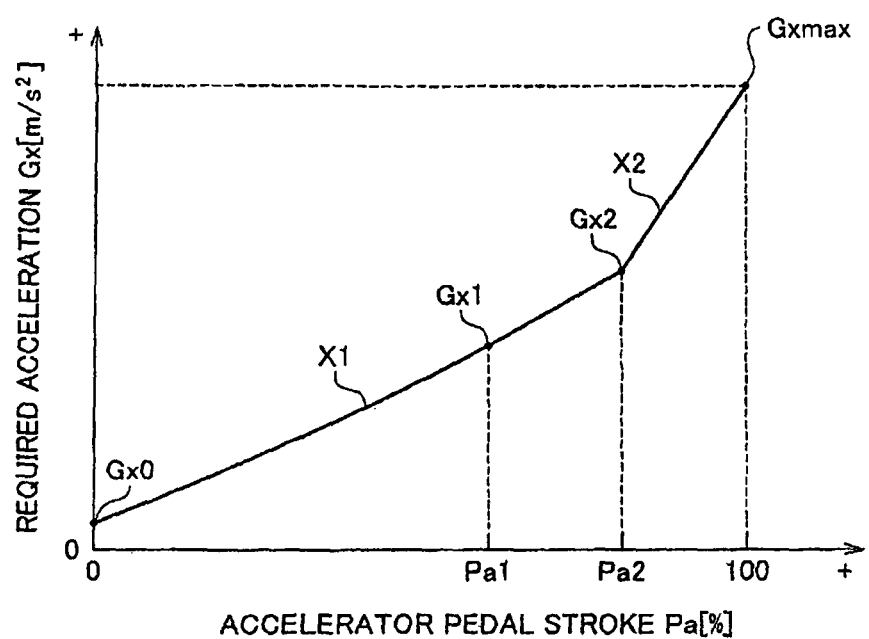
FIG. 2 is a view indicating the relationship between the required acceleration and the accelerator pedal stroke for use in the vehicle control system according to the embodiment of FIG. 1.

FIG. 1 schematically illustrates the construction or arrangement of a vehicle control system according to the embodiment of the invention. FIG. 2 indicates the relationship between the required acceleration and the accelerator pedal stroke when the vehicle speed is constant.

As shown in FIG. 1, at least the vehicle control system 1 is installed on a vehicle in which the driver rides (which will be simply called "vehicle CA"). The vehicle control system 1 consists principally of an acceleration stroke sensor 2, a vehicle speed sensor 3, an engine 4, a transmission (which will be simply called "T/M") 5, and an ECU 6. In the vehicle control system 1, the ECU 6 determines a required value, using the amount of operation of an accelerator pedal (which may also be called "accelerating operation amount") received from the acceleration stroke sensor 2, and the vehicle speed v received from the vehicle speed sensor 3, as input values, and controls the engine 4 and the T/M 5 based on the required value thus determined, so that an acceleration G (m/s$^2$) corresponding to the required value is applied to the vehicle CA. Namely, the vehicle control system 1 performs required-value demand control. Here, the vehicle control system 1 determines the required value, using the accelerating operation amount and the vehicle speed v as input values, but does not determine the required value, using the positional relationship of the vehicle CA with a surrounding vehicle(s) and an obstacle(s) as input values. In this embodiment, the required value is a required acceleration Gx (m/s$^2$), but is not limited to this provided that the required value corresponds to the acceleration G applied to the vehicle CA. For example, the required value may be required driving force Fo (N). The vehicle control system 1 does not determine the required vehicle speed, using the accelerating operation amount and the vehicle speed v (km/h).

The acceleration stroke sensor 2 serves to detect the accelerating operation amount representing the operation of the accelerator pedal by the driver. In this embodiment, the acceleration stroke sensor 2 detects an accelerator pedal stroke Pa (%) responsive to the operation of the accelerator pedal (not shown) that is operated by the driver. The acceleration stroke sensor 2 is connected to the ECU 6, and is adapted to generate a signal indicative of the accelerator pedal stroke Pa to the ECU 6, so that the ECU 6 acquires the accelerator pedal stroke Pa as an input value. The ECU 6 uses the accelerator pedal stroke Pa thus acquired when it determines the required acceleration Gx (m/s$^2$).

The vehicle speed sensor 3 serves to detect the vehicle speed v of the vehicle CA. The vehicle speed sensor 3 is connected to the ECU 6, and is adapted to generate a signal indicative of the vehicle speed v to the ECU 6, so that the ECU 0.6 acquires the vehicle speed v as an input value. The ECU 6 uses the vehicle speed v thus acquired when it determines the required acceleration Gx (m/s$^2$). The vehicle speed sensor 3 is not limited to a wheel speed sensor mounted on each wheel of the vehicle CA, a sensor that detects the rotational speed of a rotating element placed in a path from the engine 4 to driving wheels (not shown), and the like, but may be a sensor that detects position data of the vehicle CA as represented by data transmitted from the GPS. In this case, the ECU 6 calculates the vehicle speed v based on the position data received.

The engine 4 constitutes an acceleration generating device that generates an acceleration G applied to the vehicle CA. The engine 4, which is a driving power source, is a thermal engine that converts the energy of fuel into mechanical work through combustion of the fuel and generates the resulting work, and is also a reciprocating engine. The engine 4 has a fuel injection device (not shown), a throttle valve provided in an intake system (not shown) of the engine 4, an ignition plug provided in each combustion chamber (not shown) of the engine 4, and various sensors, and these devices are controlled by the ECU 6. An output shaft (not shown) of the engine 4 is coupled to an input shaft of the T/M 5, and mechanical power generated by the engine 4 is transmitted to driving wheels (not shown) via the T/M 5, so that the acceleration G is applied to the vehicle CA. The engine torque T produced by the engine 4 is controlled based on a target engine torque To that is determined based on the required acceleration Gx determined by the ECU 6. The engine 4 is provided with a crank angle sensor (not shown) that detects the rotational angle or angular position (which will be referred to as "crank angle") of the output shaft of the engine 4. A signal indicative of the crank angle is generated from the crank angle sensor to the ECU 6, and the ECU 6 acquires the crank angle as an input value.

The T/M 5 constitutes the acceleration generating device that generates an acceleration G applied to the vehicle CA. The T/M 5 is provided between the engine 4 and the driving wheels, and serves as a power transmitting mechanism that transmits mechanical power generated by the engine 4 to the driving wheels and includes an automatic transmission (not shown) that converts the engine torque T. The T/M 5 has a torque converter (not shown), automatic transmission, and various sensors, and these devices are controlled by the ECU 6. An output shaft (not shown) of the T/M 5 is coupled to the driving wheels. The speed ratio γ of the automatic transmission of the T/M 5 is controlled based on a target speed ratio γo that is determined based on the required acceleration Gx determined by the ECU 6. The engine torque T transmitted to the T/M 5 is converted according to the speed ratio γ, and is transmitted to the driving wheels, so that the acceleration G applied to the vehicle CA changes in accordance with the speed ratio γ. The automatic transmission may be a multi-speed transmission having a plurality of speeds or gear ratios, or a continuously variable transmission. In the case of the multi-speed transmission, the target speed ratio γo is a target speed or gear ratio.

The ECU 6 is a vehicle control device that controls the engine 4 and T/M 5 as the acceleration generating device, based on the accelerating operation amount representing the operation of the accelerator pedal by the driver, and the vehicle speed v of the vehicle CA. Namely, the ECU 6 functions as an engine ECU and a transmission ECU. The ECU 6 generates an injection signal, ignition signal, throttle opening signal, etc. to the engine 4, based on the calculated target engine torque To, so that fuel injection control, such as control of the fuel supply amount and injection timing of the fuel supplied to the engine 4, ignition control of the ignition plug (not shown), opening control of the throttle valve, etc. are performed according to the above-indicated output signals. The ECU 6 also generates various hydraulic control signals to the T/M 5, based on the calculated target speed ratio γo, so that shift control of the automatic transmission of the T/M 5 is performed according to the output signals. The hardware configuration of the ECU 6 includes a CPU (Central Processing Unit) that mainly performs arithmetic operations or computations, memories (RAM, such as SPRAM, ROM (Read Only Memory) such as EEPROM) in which programs and information are stored, input/output interface, and so forth. The ECU 6 is similar to ECU installed on known vehicles, and therefore will not be described in detail.

In this embodiment, the ECU 6 determines a required acceleration Gx based on the accelerator pedal stroke Pa and the vehicle speed v of the vehicle CA, determines a dynamic required acceleration Gy based on the required acceleration Gx thus determined, determines a required driving force Fo based on the dynamic required acceleration Gy thus determined, determines a target engine torque To and a target speed ratio γo based on the required driving force Fo thus determined, and controls the engine 4 and the T/M 5 based on the target engine torque To and target speed ratio γo thus determined. The ECU 6 includes a static required acceleration calculating unit 61, a dynamic required acceleration calculating unit 62, a required driving force calculating unit 63, and a target value calculating unit 64.

The static required acceleration calculating unit 61 determines the required acceleration Gx as the required value, based on the relationship between the accelerating operation amount and the required value, which relationship includes, as a condition, an acceleration corresponding to a given accelerating operation amount, which is determined by the relationship between the vehicle speed v and the acceleration G (which will be simply called "v-G relationship") when the accelerating operation amount is constant. The static required acceleration calculating unit 61 calculates the required acceleration Gx as the static required acceleration, based on the accelerator pedal stroke Pa and the vehicle speed v, according to the relationship between the accelerator pedal stroke Pa and the required acceleration Gx (which will be simply called "Pa-Gx relationship"), including, as a condition, an acceleration Gx1 corresponding to a given accelerator pedal stroke Pa1 which is determined according to the v-G relationship, and generates the required acceleration Gx to the dynamic required acceleration calculating unit 62. The static required acceleration calculating unit 61 calculates the required acceleration Gx based on the accelerator pedal stroke Pa, vehicle speed v, and an exponential function based on the Weber-Fechner's law (which will be simply called "WF exponential function"), The WF exponential function is defined so that, when the accelerator pedal stroke Pa is equal to the given accelerator pedal stroke Pa1 at a certain vehicle speed v, the acceleration Gx1 corresponding to the given accelerator pedal stroke Pa1 at the same vehicle speed v is calculated as the required acceleration Gx. Accordingly, the static required acceleration calculating unit 61 calculates the same acceleration Gx1 corresponding to the given accelerator pedal stroke as the required acceleration Gx, where the vehicle runs at the same speed v with the given accelerator pedal stroke Pa1. Namely, the Pa-Gx relationship according to this embodiment has a given characteristic that the required acceleration Gx is calculated based on the WF exponential function. Also, the Pa-Gx relationship according to this embodiment has a given characteristic that the acceleration Gx1 corresponding to the given accelerator pedal stroke, which is determined according to the v-G relationship at the given accelerator pedal stroke Pa1, is calculated as the required acceleration Gx at the given accelerator pedal stroke Pa1. While the given accelerator pedal stroke Pa1 is set to 60% in this embodiment, it is not limited to this value, but may be set as appropriate under various conditions, such as the vehicle type, the construction of the acceleration generating device installed on the vehicle, and the specifications of the vehicle CA. The given accelerator pedal stroke Pa1 is preferably set to a relatively large accelerator pedal stroke Pa that is not close the maximum accelerator pedal stroke Pamax. This is because the gradient of a relationship line X2 (which will be described later) becomes larger as the given accelerator pedal stroke Pa1 is closer to the maximum accelerator pedal stroke Pamax.

Figure 5:
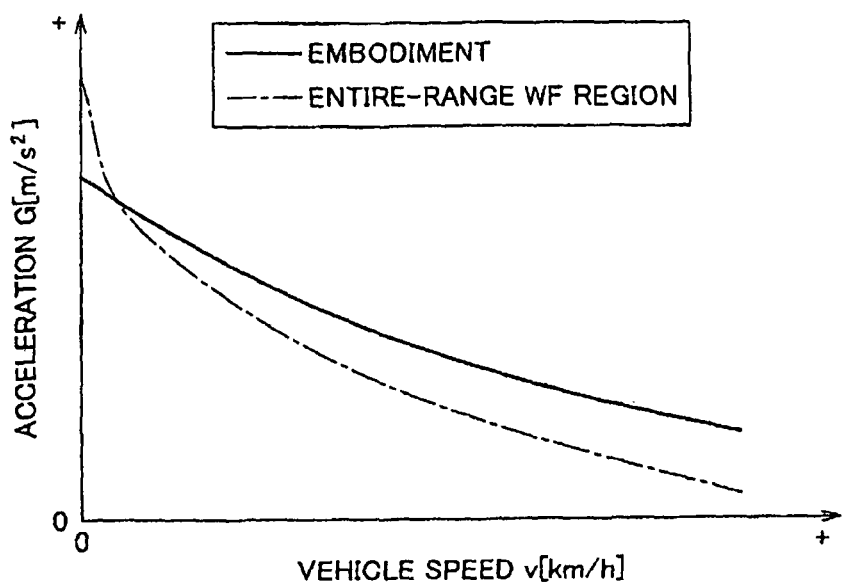
FIG. 5 is a view indicating the relationship between the acceleration and the vehicle speed when the accelerator pedal stroke is held at a given value.

The Pa-Gx relationship includes, as conditions, the acceleration Gx1 corresponding to the given accelerator pedal stroke, and the minimum acceleration Gx0 as an acceleration G to be achieved when an idling turns from ON to OFF. In this connection, the idling is. ON when the accelerator pedal stroke Pa is 0%, or Pa0 indicative of the fully released position of the accelerator pedal, (i.e., when the accelerator pedal is released), and the idling is OFF when the accelerator pedal stroke Pa is other than Pa0 indicative of the fully released position of the accelerator pedal (i.e., when the accelerator pedal is depressed). The WF exponential function is defined so that the minimum acceleration Gx0 is calculated as the required acceleration Gx when the idling is ON, namely, when the accelerator pedal stroke Pa is equal to Pa0 indicative of the fully released position of the accelerator pedal. In this embodiment, a selected one of the minimum generable acceleration Gxmin as an acceleration G that can be generated acceleration Gx0, from the time when the accelerator pedal stroke Pa is 0, namely, the by the engine 4 and T/M 5 as the acceleration generating device when the idling turns from ON to OFF, and a value determined depending on the vehicle speed v, i.e., set minimum acceleration Gx0', is determined as the minimum acceleration Gx0. The minimum generable acceleration Gxmin is calculated based on elements, such as the current vehicle speed v, speed ratio γ, lock-up engaging condition in the case where the torque converter is equipped with a lock-up clutch, learned value of the fuel flow rate, feedback correction amount for the fuel flow rate, correction amount for the fuel flow rate upon starting, fuel-cut condition, engine coolant temperature, load of an air compressor, load (electric load) of an alternator, catalyst warm-up correction amount for the fuel flow rate, regarding a catalyst provided in an exhaust system, engine-stop avoidance correction amount for the fuel flow rate, correction amount due to purge, for the fuel flow rate, and a correction amount for the fuel flow rate during a deceleration transition period. The above-mentioned set minimum acceleration Gx0' is set in advance in relation to the vehicle speed v. For example, the set minimum acceleration Gx0' is set to be reduced as the vehicle speed v increases, as shown in FIG. 5.

In this embodiment, the static required acceleration calculating unit 61 determines the set minimum acceleration Gx0' as the minimum acceleration Gx0 when the idling is ON, and determines the minimum generable acceleration Gxmin as the minimum acceleration Gx0 when the idling turns from ON to OFF, if the set minimum acceleration Gx0' at the time of switching of the idling from ON to OFF is different from the calculated minimum generable acceleration Gxmin. When the idling is. OFF, the minimum acceleration Gx0 is kept at the minimum generable acceleration Gxmin, irrespective of the vehicle speed v. Namely, when the idling is OFF, namely, when the accelerator pedal stroke Pa is other than Pa0 indicative of the fully released position of the accelerator pedal, the minimum generable acceleration Gxmin is set as the minimum acceleration Gx0.

The Pa-Gx relationship will be described with respect to the case where the accelerator pedal stroke Pa is in a region larger than at least the given accelerator pedal stroke Pa1, more specifically, according to this embodiment, where the accelerator pedal stroke Pa exceeds a boundary accelerator pedal stroke Pa2 (>Pa1) that is larger than the given accelerator pedal stroke Pa1. The Pa-Gx relationship includes, as a condition, the maximum generable acceleration Gxmax as an acceleration G that can be generated by the engine 4 and TN 5 when the accelerator pedal stroke Pa is at the maximum or equal to 100% (where the accelerating operation amount is at the maximum), namely, when it is equal to the maximum accelerator pedal stroke Pamax. When the accelerator pedal stroke Pa exceeds the boundary accelerator pedal stroke Pa2 at a certain vehicle speed v, the static required acceleration calculating unit 61 calculates the required acceleration Gx by complementing a boundary required acceleration Gx2 calculated based on the vehicle speed v, boundary accelerator pedal stroke Pa2 and the WF exponential function, based on the maximum generable acceleration Gxmax at the vehicle speed v. More specifically, the static required acceleration calculating unit 61 calculates the required acceleration Gx by performing a linear interpolation based on the boundary required acceleration Gx2 and the maximum generable acceleration Gxmax. Here, when the accelerator pedal stroke Pa is equal to the maximum accelerator pedal stroke Pamax at a certain vehicle speed v, the static required acceleration calculating unit 61 calculates the maximum generable acceleration Gxmax at the same vehicle speed v, as the required acceleration Gx. Namely, the Pa-Gx relationship is defined so that the required acceleration Gx becomes equal to the maximum generable acceleration Gxmax when the accelerator pedal reaches the maximum accelerator pedal stroke Pamax. Thus, as shown in FIG. 2, the Pa-Gx relationship is expressed by a combination of a relationship line X1 (based on the WF exponential function) representing the relationship between the accelerator pedal stroke Pa and the required acceleration Gx, which includes the acceleration Gx1 corresponding to the given accelerator pedal stroke, and a relationship line X2 (as a result of linear interpolation between the boundary required acceleration Gx2 and the maximum generable acceleration Gxmax) representing the relationship between the accelerator pedal stroke Pa and the required acceleration Gx, which includes the maximum generable acceleration Gxmax. The required acceleration Gx is calculated based on the WF exponential function including, as conditions, the acceleration Gx1 corresponding to the given accelerator pedal stroke, and the minimum acceleration Gx0, from the time when the accelerator pedal stroke Pa is 0, namely, the idling is ON. If the accelerator pedal stroke Pa is brought into a region larger than at least the given accelerator pedal stroke Pa1, the required acceleration Gx is calculated while being Complemented by the maximum generable acceleration Gxmax, in view of the maximum output characteristic of the acceleration generating device. Namely, the Pa-Gx relationship according to this embodiment has a given characteristic that the required acceleration Gx is complemented by the maximum generable acceleration Gxmax if the accelerator pedal stroke Pa falls in the region larger than at least the given accelerator pedal stroke Pa1. Also, the Pa-Gx relationship according to this embodiment has a given characteristic that the maximum generable acceleration Gxmax becomes the required acceleration Gx at the maximum accelerator pedal stroke Pamax. While the boundary accelerator pedal stroke Pa2 is equal to 80% in this embodiment, it is not limited to this value, but may be set as appropriate under various conditions, such as the vehicle type, the construction of the acceleration generating device installed on the vehicle, and the specifications of the vehicle CA, for example. Also, the complementation method is not limited to the linear interpolation, but other polynomial interpolation may be used.

The dynamic required acceleration calculating unit 62 determines the dynamic required acceleration Gy ($m/s^2$). The dynamic required acceleration calculating unit 62 calculates the dynamic required acceleration Gy, based on the required acceleration Gx calculated by the static required acceleration calculating unit 61, and generates the calculated dynamic required acceleration Gy to the required driving force calculating unit 63. The dynamic required acceleration calculating unit 62 determines how the acceleration G applied to the vehicle CA is changed to be equal to the determined required acceleration Gx, or a curve along which the acceleration G reaches the required acceleration Gx, using a dynamic filter. Thus, the dynamic required acceleration calculating unit 62 is able to change the response of the throttle opening Sa that has an influence on the acceleration Q to the accelerator pedal stroke Pa. When the vehicle CA is started, for example, the dynamic required acceleration Gy is calculated with the degree of smoothing being increased by the dynamic filer, so as to lower the response of the acceleration G, thus enabling the vehicle to be smoothly started. When the driver operates the accelerator pedal at a high speed, for example, the dynamic required acceleration Gy is calculated with the degree of smoothing being reduced by the dynamic filter, so as to increase the response of the acceleration G, so that the throttle valve of the engine 4 is temporarily opened by an excessively large degree, thus causing a high-response acceleration G to be applied to the vehicle CA. Namely, the ECU 6, in which the static required acceleration calculating unit 61 and the dynamic required acceleration calculating unit 62 are provided independently of each other, makes it possible to separate or distinguish a nonlinear characteristic of the throttle opening Sa relative to the accelerator pedal stroke Pa determined by the static required acceleration calculating unit 61, i.e., a nonlinear characteristic of the acceleration G relative to the accelerator pedal stroke Pa, from the response of the throttle opening Sa to the accelerator pedal stroke Pa determined by the dynamic required acceleration calculating unit 62, i.e., the response of the acceleration G to the accelerator pedal stroke Pa.

The required driving force calculating unit 63 determines the required driving force Fo. The required driving force calculating unit 63 calculates the required driving force Fo based on the dynamic required acceleration Gy calculated by the dynamic required acceleration calculating unit 62, and generates the calculated required driving force Fo to the target value calculating unit 64. The required driving force calculating unit 63 calculates the required driving force Fo, based on the specifications of the vehicle CA and the running resistance. For example, the required driving force calculating unit 63 calculates the required driving force Fo by adding the driving force based on the dynamic required acceleration Gy and the mass of the vehicle CA and the driving force based on the running resistance together.

The target value calculating unit 64 determines a target value used for controlling the acceleration generating device. The target value calculating unit 64 calculates the target engine torque To and the target speed ratio γo, based on the required driving force Fo calculated by the required driving force calculating unit 63. The ECU 6 controls the engine 4 and the T/M 5 so that the engine torque T produced by the engine 4 and the speed ratio γ become equal to the target engine torque To and the target speed ratio γo, respectively.

Figure 3:
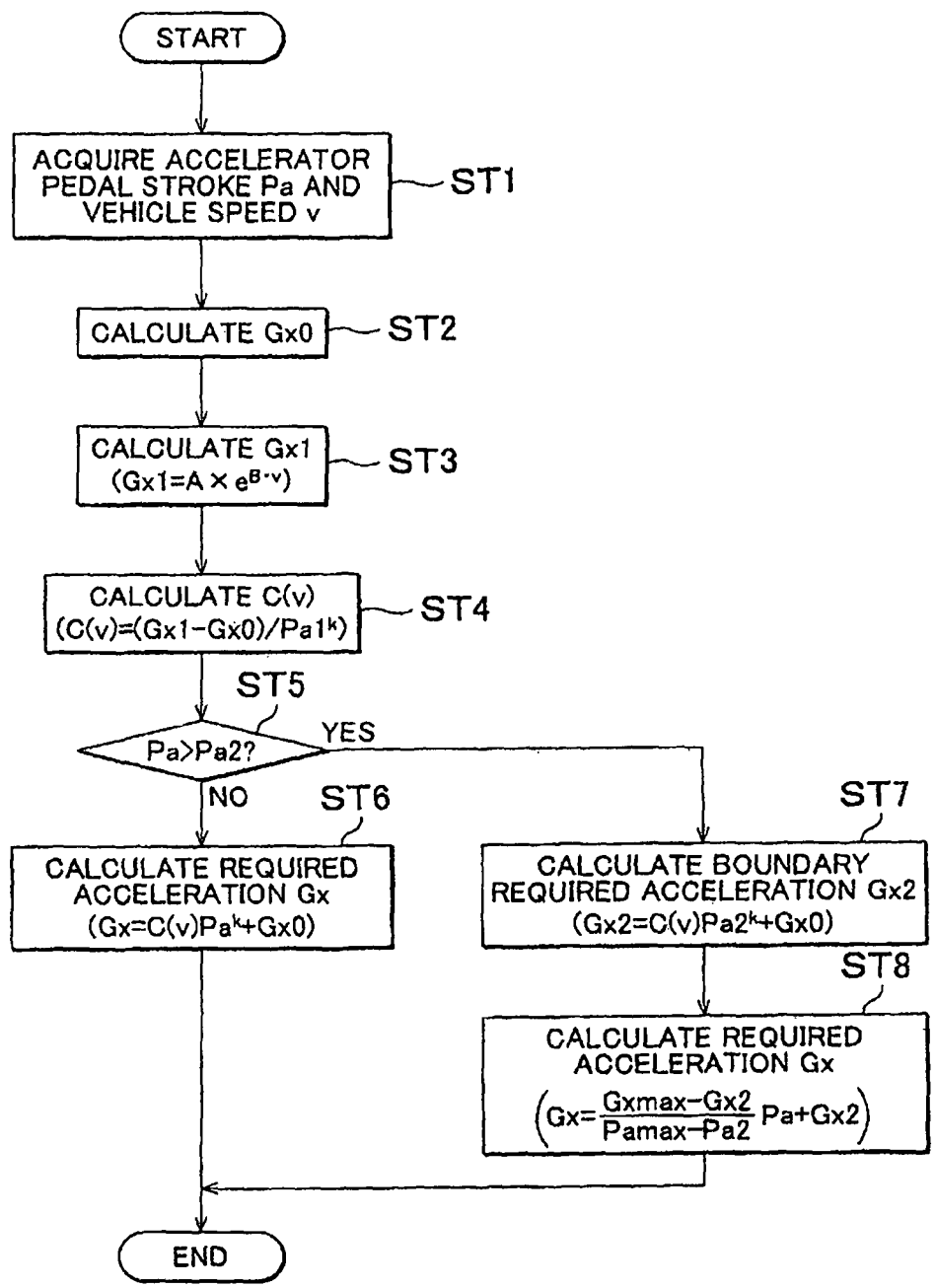
FIG. 3 is a control flow chart illustrating a vehicle control method implemented by the vehicle control system of the embodiment.
Figure 4:
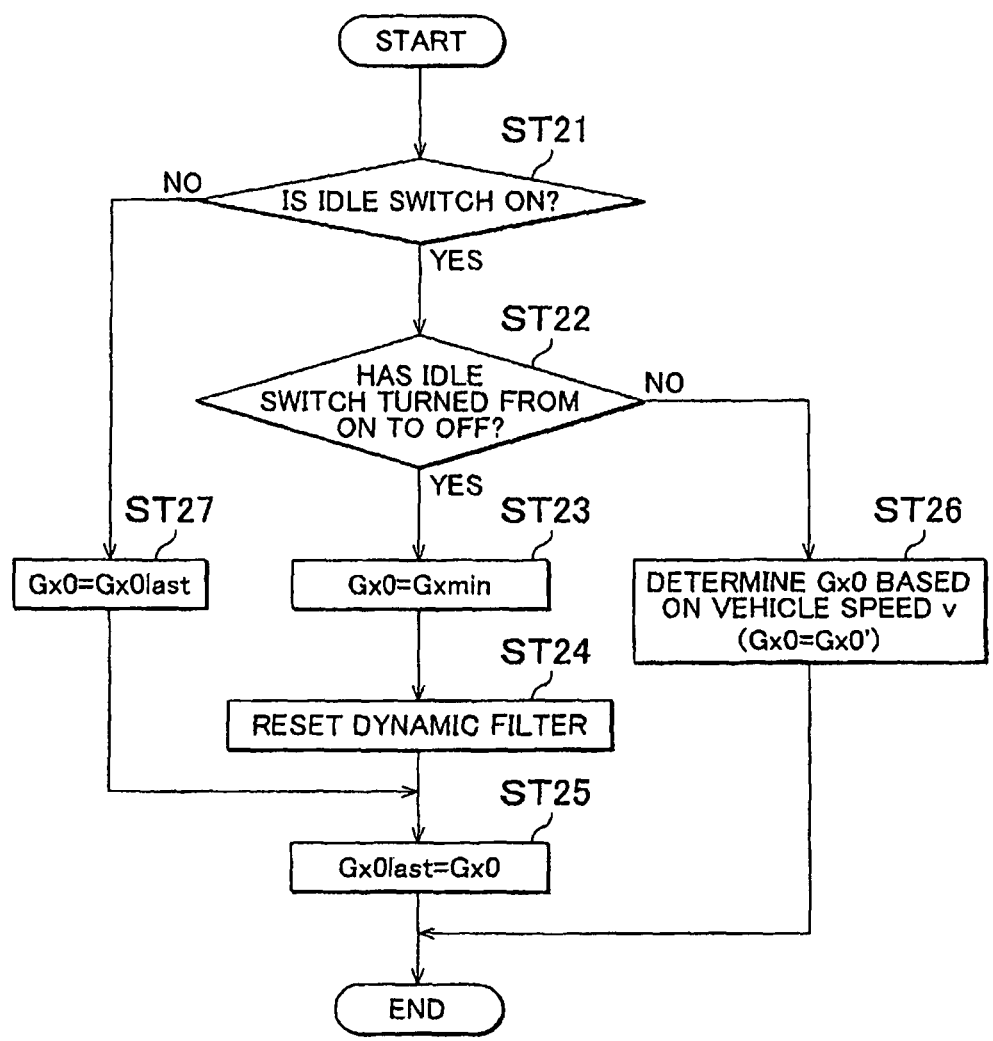
FIG. 4 is a control flow chart illustrating a part of the vehicle control method implemented by the vehicle control system of the embodiment.
Figure 6:
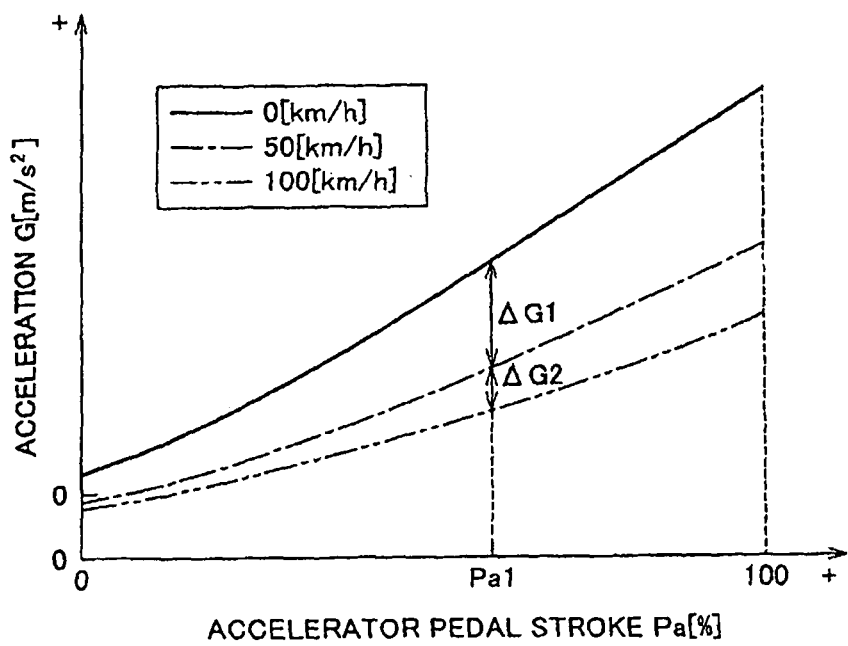
FIG. 6 is a view indicating the relationship among the acceleration, accelerator pedal stroke, and the vehicle speed.
Figure 7:
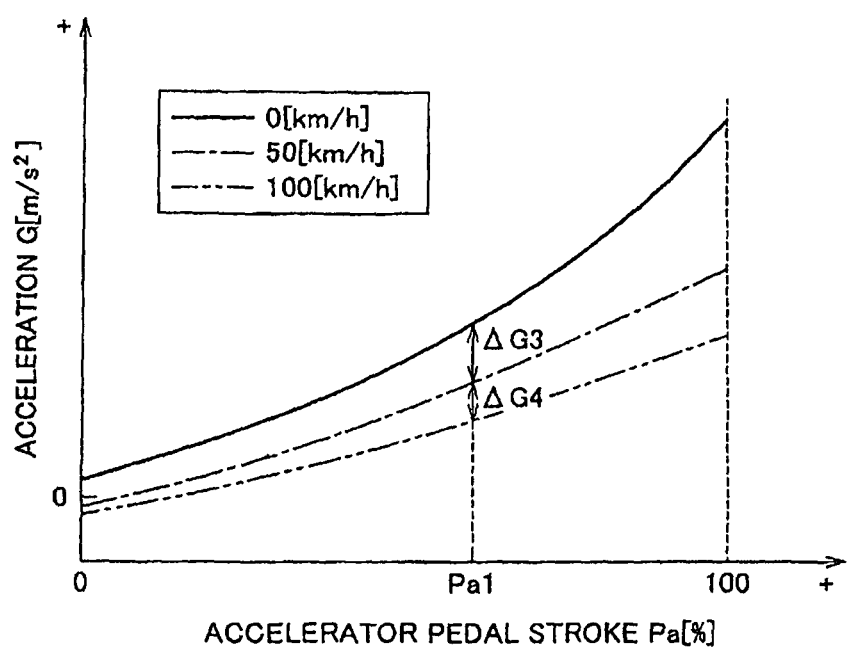
FIG. 7 is a view indicating the relationship among the acceleration, accelerator pedal stroke, and the vehicle speed.
Figure 8:
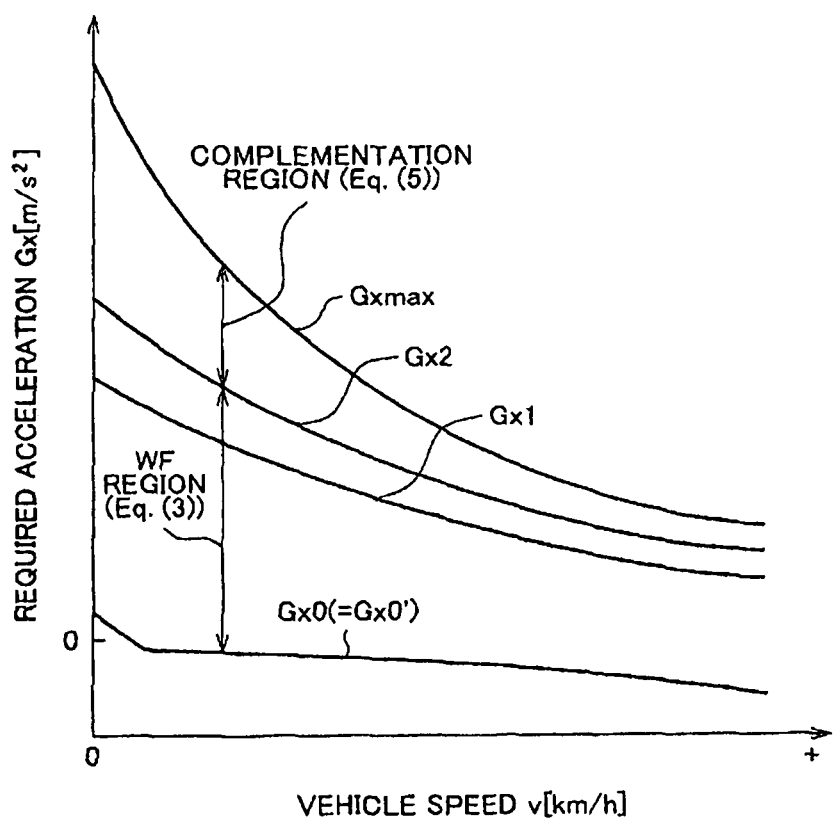
FIG. 8 is a view indicating the relationship between the required acceleration and the vehicle speed when the accelerator pedal stroke is held at a given value.

Next, a vehicle control method implemented by the vehicle control system 1 will be explained. Here, a method of determining the required acceleration Gx based on the accelerator pedal stroke Pa and the vehicle speed v will be explained. The method of controlling the engine 4 and the T/M 5 based on the determined required acceleration Gx has been explained above, and therefore will not be described herein. FIG. 3 is a control flow chart illustrating the vehicle control method implemented by the vehicle control system according to the embodiment. FIG. 4 is a control flow chart illustrating a part of the vehicle control method implemented by the vehicle control system according to the embodiment. FIG. 5 shows the relationship between the acceleration and the vehicle speed at a given accelerator pedal stroke. FIG. 6 shows the relationship among the acceleration, accelerator pedal stroke, and the vehicle speed. FIG. 7 shows the relationship among the acceleration, accelerator pedal stroke, and the vehicle speed. FIG. 8 shows the relationship between the required acceleration and the vehicle speed when the accelerator pedal stroke is equal to a given value.

Figure 9:
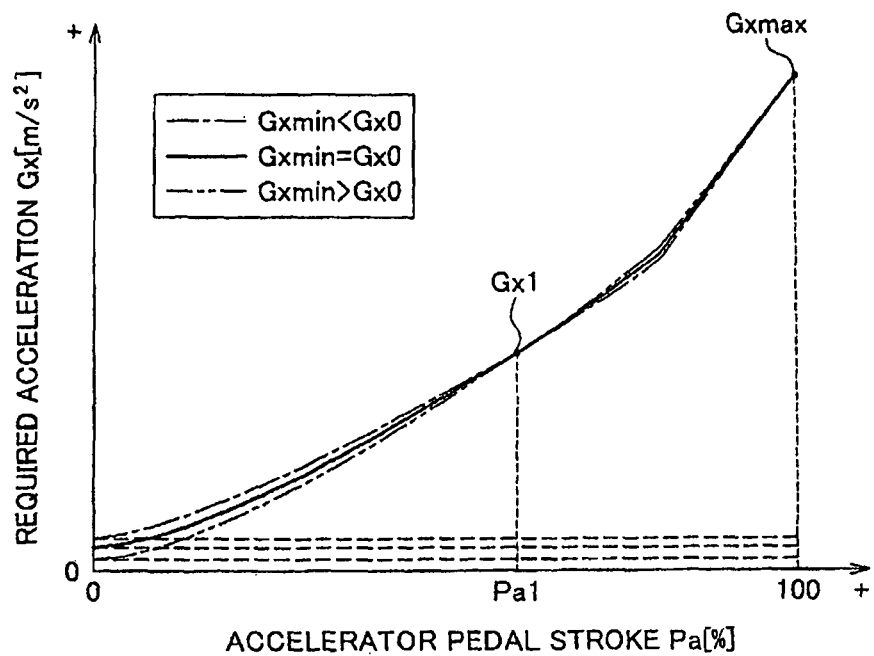
FIG. 9 is a view indicating the relationship between the required acceleration and the accelerator pedal stroke when the vehicle speed is constant.
Figure 10:
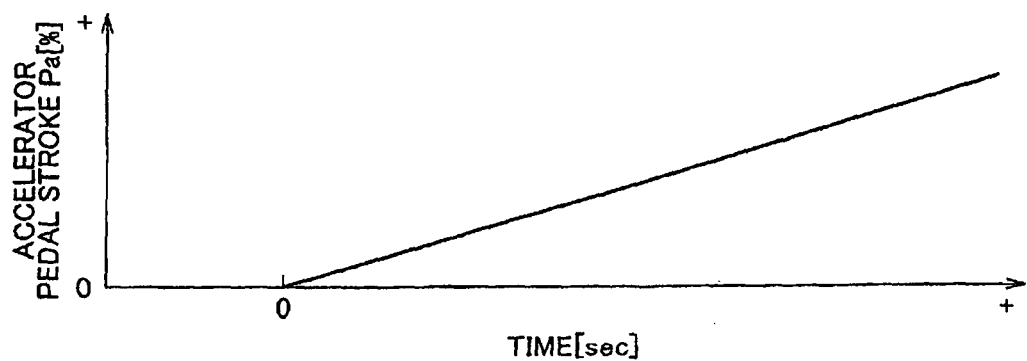
FIG. 10 is a view indicating the relationship between the accelerator pedal stroke and time.
Figure 11:
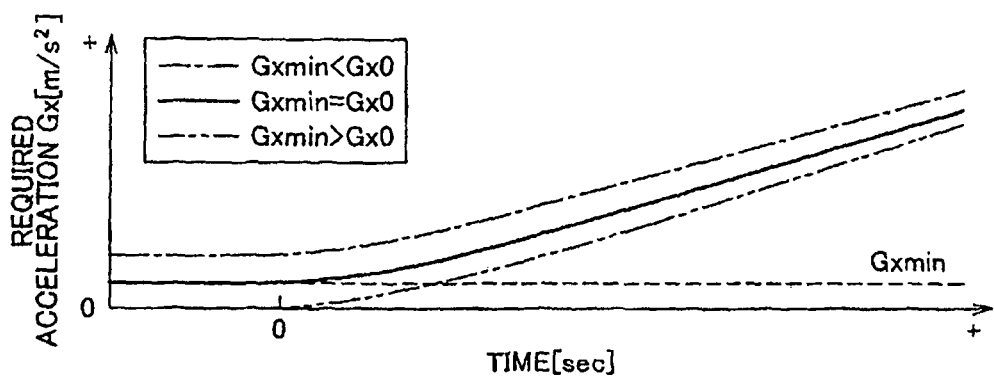
FIG. 11 is a view indicating the relationship between the required acceleration and time.
Figure 12:
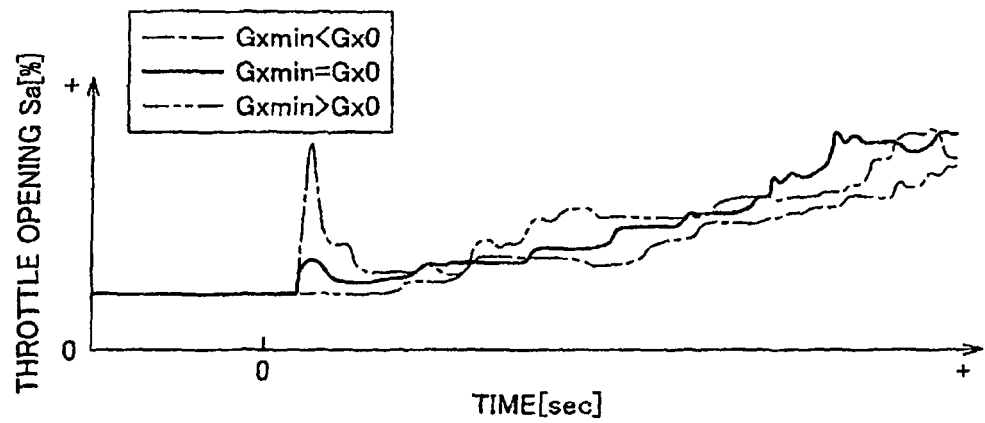
FIG. 12 is a view indicating the relationship between the throttle opening and time.

FIG. 9 shows the relationship between the required acceleration and the accelerator pedal stroke when the vehicle speed is constant. FIG. 10 shows the relationship between the accelerator pedal stroke and time. FIG. 11 shows the relationship between the required acceleration and time. FIG. 12 shows the relationship between the throttle opening and time.

Initially, as shown in FIG. 3, the ECU 6 of the vehicle control system 1 acquires the accelerator pedal, stroke Pa and the vehicle speed v of the vehicle CA, as described above (step ST1).

Then, the ECU 6 calculates the minimum acceleration Gx0 (step ST2). Initially, the ECU 6 determines whether the idling is ON (step ST21), as shown in FIG. 4. In this step, the ECU 6 determines whether the accelerator pedal stroke Pa is equal to Pa0 indicative of the fully released position of the accelerator pedal.

If the ECU 6 determines that the idling is ON (i.e., if an affirmative decision is made in step ST21), it determines whether the idling has turned from ON to OFF (step ST22). In this step, the ECU 6 determine which of the maximum generable acceleration Gxmin and the set minimum acceleration Gx0' is determined as the minimum acceleration Gx0, by determining whether the accelerator pedal stroke Pa has changed from Pa0 indicative of the fully released position of the accelerator pedal, to a value other than Pa0.

If the ECU 6 determines that the idling has turned from ON to OFF (i.e., if an affirmative decision is made in step ST22), it calculates the minimum generable acceleration Gxmin, and determines the calculated minimum generable acceleration Gxmin as the minimum acceleration Gx0 (Gx0=Gxmin) (step ST23).

Then, the ECU 6 resets the dynamic filter (step ST24). Since the ECU 6 resets the dynamic filter when the idling turns from ON to OFF and the driver starts operating the accelerator pedal, the dynamic required acceleration calculating unit 62 is able to calculate the dynamic required acceleration Gy using a new dynamic filter, based on the required acceleration Gx calculated based on the minimum generable acceleration Gxmin as the minimum acceleration Gx0. Thus, when the required acceleration Gx is changed based on a change of the minimum acceleration Gx0, the vehicle is less likely to be influenced by the required driving force Fo before it is corrected, which would occur if the dynamic filter is not reset.

Then, the ECU 6 determines the determined minimum acceleration Gx0 as the minimum acceleration Gx0last of the last cycle (Gx0=Gx0last) (step ST25).

If the ECU 6 determines that the idling has not turned from ON to OFF (i.e., if a negative decision is made in step ST22), it sets the set minimum acceleration Gx0' based on the vehicle speed v, and determines the thus set minimum acceleration Gx0' as the minimum acceleration Gx0 (Gx0=Gx0') (step ST26).

If the ECU 6 determines that the idling is OFF (i.e., if a negative decision is made in step ST21), it determines the minimum acceleration Gx0last determined in the last cycle, as the minimum acceleration Gx0 (Gx0last=Gx0) (step ST27). In this embodiment, the ECU 6 sets the minimum generable acceleration Gxmin calculated upon switching of the idling from ON to OFF, as the minimum acceleration Gx0, until the accelerator pedal stroke Pa changes from Pa0 indicative of the fully released position of the accelerator pedal to a value other than Pa0, and becomes equal to Pa0 indicative of the fully released position again.

Then, the ECU 6 calculates the acceleration Gx1 corresponding to a given accelerator pedal stroke, as shown in FIG. 3 (step ST3). In this step, the ECU 6 calculates the acceleration Gx1 corresponding to the given accelerator pedal stroke, according to the acquired accelerator pedal stroke Pa, vehicle speed v, and the equation (1) as indicated below. In the equation (1): A is larger than 0, and determines the required acceleration Gx when the vehicle speed v is 0. B is smaller than 0, and determines the degree or rate of reduction of the required acceleration Gx with increase of the vehicle speed v. A and B are set as appropriate, under various conditions, such as the vehicle type, the construction of the acceleration generating device installed on the vehicle, and the specifications of the vehicle CA. For example, A=5 and B=−0.02, or A=6 and B=−0.015. Namely, the v-G relationship when the accelerator pedal stroke Pa is equal to a given value is determined from the following equation (1).

$$Gx1 = A \times e^{B \cdot v} \tag{1}$$

Then, the ECU 6 calculates C(v) (step ST4). In this step, the ECU 6 calculates C(v), according to the calculated minimum acceleration Gx0, the calculated acceleration. Gx1 corresponding to the given accelerator pedal stroke, the given accelerator pedal stroke Pa1, the Weber ratio k, and the following equation (2). For, example, the Weber ratio k is set as appropriate in view of the controllability at the time of starting or re-accelerating of the vehicle CA, and k is set to, for example, 1.2.

$$C(v) = (Gx1 - Gx0)/Pa1^k \tag{2}$$

Then, the ECU 6 determines whether the accelerator pedal stroke Pa exceeds the boundary accelerator pedal stroke Pa2 (step ST5). In this step, the ECU 6 determines whether the accelerator pedal stroke Pa exceeds the boundary accelerator pedal stroke Pa2, so as to determine whether the required acceleration Gx is calculated according to the WF exponential function, or calculated by complementation based on the maximum generable acceleration Gxmax. Namely, the ECU 6 determines whether the required acceleration Gx is determined based on the relationship line X1 representing the relationship between the accelerator pedal stroke Pa and the required acceleration Gx, which contains the acceleration Gx1 corresponding to the given accelerator pedal stroke, or determined based on the relationship line X2 representing the relationship between the accelerator pedal stroke Pa and the required acceleration Gx, which contains the maximum generable acceleration Gxmax.

Then, if the ECU 6 determines that the accelerator pedal stroke Pa is equal to or smaller than the boundary accelerator pedal stroke Pa2 (i.e., if a negative decision is made in step ST5), it calculates the required acceleration Gx (step ST6). In this step, the ECU 6 calculates the required acceleration Gx based on the WF exponential function. The ECU 6 calculates the required acceleration Gx, according to the accelerator pedal stroke Pa, the calculated C(v), the calculated minimum acceleration Gx0, and the following equation (3).

$$Gx = C(v)Pa^k + Gx0 \tag{3}$$

If the ECU 6 determines that the accelerator pedal stroke Pa is larger than the boundary accelerator pedal stroke Pa2 (i.e., if an affirmative decision is made in step ST5), it calculates the boundary required acceleration Gx2 (step ST7). In this step, the ECU 6 calculates the boundary required acceleration Gx2, according to the boundary accelerator pedal stroke Pa2, the calculated C(v), the calculated minimum acceleration Gx0, and the following equation (4).

$$Gx2 = C(v)Pa2^k + Gx0 \tag{4}$$

Then, the ECU 6 calculates the required acceleration Gx (step ST8). In this step, the ECU 6 calculates the required acceleration Gx based on the maximum generable acceleration Gxmax. The ECU 6 calculates the required acceleration Gx, according to the accelerator pedal stroke Pa, the maximum accelerator pedal stroke Pamax, the boundary accelerator pedal stroke Pa2, the maximum generable acceleration Gxmax, the calculated boundary required acceleration Gx2, and the following equation (5).

$$Gx=(Gxmax-Gx2)/(Pamax-Pa2)Pa+Gx2 \qquad (5)$$

As described above, in the vehicle control system 1 according to the embodiment, the v-G relationship at the given accelerator pedal stroke Pa1 has an influence on the determination of the required acceleration Gx. In this embodiment, the v-G relationship at the given accelerator pedal stroke Pa1 may be designed as indicated by the solid line in FIG. 5, according to the above-indicated equation (1). The one-dot chain line in FIG. 5 indicates a v-G relationship at the given accelerator pedal stroke Pa1 in the case where the Weber-Fechner's law is applied to the entire range of the accelerator pedal stroke Pa (which will be called "entire-range WF region"). The above-mentioned WF exponential function is defined or determined so that the minimum acceleration Gx0 at a certain vehicle speed v is calculated as the required acceleration Gx when the accelerator pedal stroke Pa at the vehicle speed v is equal to Pa0 indicative of the fully released position of the accelerator pedal, and the maximum generable acceleration Gxmax at a certain vehicle speed v is calculated as the required acceleration Gx when the accelerator pedal stroke Pa at the vehicle speed v is equal to the maximum accelerator pedal stroke Pamax. As shown in FIG. 5, the v-G relationship at the given accelerator pedal stroke Pa1 according to this embodiment is designed such that the acceleration G applied to the vehicle CA is generally reduced at a low rate as the vehicle speed v increases, as compared with the case of the entire-range WF region. Namely, the v-G relationship at the given accelerator pedal stroke Pa1 according to the invention is designed such that the line representing the relationship between the vehicle speed v and the acceleration G has a nearly uniform slope or gradient. Accordingly, while the v-G relationship at the given accelerator pedal stroke Pa1 is determined while being influenced by the maximum generable acceleration Gxmax in the case of the entire-range WF region, the v-G relationship according to this embodiment is less likely to be influenced by the maximum generable acceleration Gxmax. Consequently, the Pa-Gx relationship including, as a condition, the v-G relationship at the given accelerator pedal stroke Pa1 makes it possible to design the acceleration G applied to the vehicle CA in the direction of vehicle speed when the accelerator pedal stroke Pa is kept at the given accelerator pedal stroke Pa1.

According to the relationship between the accelerator pedal stroke Pa and the acceleration G (which will be called "Pa-G relationship") in the case of the entire-range WF region, for example, when the accelerator pedal stroke Pa is equal to the given accelerator pedal stroke Pa1, an acceleration change or difference ΔG1 between an acceleration G at 0 km/h as indicated by the solid line in FIG. 6 and an acceleration G at 50 km/h as indicated by the one-dot chain line in FIG. 6 is significantly larger than an acceleration change or difference ΔG2 between the acceleration G at 50 km/h and an acceleration G at 100 km/h as indicated by the two-dot chain line in FIG. 6. Accordingly, the acceleration G changes largely depending on the vehicle speed v, even at the given accelerator pedal stroke Pa1. Thus, it is difficult to design the acceleration G in the direction of vehicle speed at the given accelerator pedal stroke Pa1, using the Pa-G relationship in the case of the entire-range WF region. However, according to the Pa-Gx relationship (Pa-G relationship) including, as a condition, the v-G relationship at the given accelerator pedal stroke Pa1 according to the embodiment, when the accelerator pedal stroke Pa is equal to the given accelerator pedal stroke Pa1, a difference between an acceleration change or difference ΔG3 between an acceleration G at 0 km/h as indicated by the solid line in FIG. 7 (showing the relationship between the accelerator pedal stroke Pa and the acceleration G according to the embodiment) and an acceleration G at 50 km/h as indicated by the one-dot chain line in FIG. 7, and an acceleration variation or difference ΔG4 between the acceleration G at 50 km/h and an acceleration G at 100 km/h as indicated by the two-dot chain line in FIG. 7 is smaller than a difference between the acceleration change ΔG1 and the acceleration change ΔG2. Accordingly, the acceleration G is less likely or unlikely to change largely depending on the vehicle speed v, even at the given accelerator pedal stroke Pa1. Thus, the Pa-Gx relationship including, as a condition, the v-G relationship at the given accelerator pedal stroke Pa1 makes it possible to design the acceleration G in the direction of vehicle speed at the given accelerator pedal stroke Pa1. It will be understood from the above description that the optimum required acceleration Gx responsive to the accelerator pedal stroke Pa of the driver is determined, so as to sufficiently achieve an acceleration that agrees with the sensibility of the driver. If the accelerator pedal stroke. Pa is at the same value, substantially the same acceleration feeling can be given to the driver irrespective of the vehicle speed v.

If the Pa-Gx relationship only includes, as conditions, the minimum acceleration Gx0 and the v-G relationship at the given accelerator pedal stroke Pa1, the required acceleration Gx becomes smaller than the maximum generable acceleration Gxmax even when the accelerator pedal stroke Pa is equal to the maximum accelerator pedal stroke Pamax. Accordingly, as the accelerator pedal stroke Pa gets closer to the maximum accelerator pedal stroke Pamax, a difference between the acceleration G determined according to the above Pa-Gx relationship and the acceleration G that can be generated by the engine 4 and T/M 5 as the acceleration generating device may increase. Therefore, the Pa-Gx relationship used in the vehicle control system 1 of the embodiment includes, as conditions, the minimum acceleration Gx0, the v-G relationship at the given accelerator pedal stroke Pa1, and the maximum generable acceleration Gxmax, when the accelerator pedal stroke Pa exceeds the boundary accelerator pedal stroke Pa2 that is larger than the given accelerator pedal stroke Pa1. The Pa-Gx relationship according to the embodiment consists of a first Pa-Gx relationship (the above-indicated equation (3)) as a Pa-Gx relationship based on the Weber-Fechner's law, and a second Pa-Gx relationship (the above-indicated equation (5)) as a Pa-Gx relationship that involves complementation based on the maximum generable acceleration Gxmax so that the required acceleration Gx becomes equal to the maximum generable acceleration Gxmax at the maximum accelerator pedal stroke Pamax. As shown in FIG. 8, when the accelerator pedal stroke Pa is equal to or smaller than the boundary accelerator pedal stroke. Pa2, the first Pa-Gx relationship is applied (the WF region). When the accelerator pedal stroke Pa exceeds the boundary accelerator pedal stroke Pa2, the second Pa-Gx relationship is applied (the complementation region). Accordingly, in a region where the accelerator pedal stroke Pa is large, a difference between an acceleration G applied to the vehicle CA and an acceleration G that can be generated by the engine 4 and T/M 5 as the acceleration generating device, at the same accelerator pedal stroke Pa, is less likely or unlikely to be increased, or reduced. Consequently, it is possible to sufficiently achieve an acceleration that meets or agrees with the sensibility of the driver, by taking the maximum generable acceleration Gxmax into consideration.

According to the second Pa-Gx relationship, the required acceleration Gx is equal to the maximum generable acceleration Gxmax when the accelerator pedal stroke Pa is equal to the maximum accelerator pedal stroke Pamax; therefore, the maximum generable acceleration Gxmax is applied to the vehicle CA at the maximum accelerator pedal stroke Pamax. Accordingly, the maximum output of the engine 4 can be ensured, and an acceleration that meets or agrees with the sensibility of the driver can be sufficiently achieved.

In the vehicle control system 1 that performs torque demand control, a value, such as driving force, which corresponds to an acceleration that can be generated by the engine 4 and T/M 5 as the acceleration generating device when the idling is ON is limited by the current vehicle speed v, speed ratio γ, lock-up engaging condition when the torque converter is equipped with a lock-up clutch, and a fuel-cut condition. Accordingly, there arises a difference between the driving force determined under torque demand control when the idling is ON, and the driving force that can be actually generated. As a result, when the driver performs an accelerating operation and the idling turns from ON to OFF, the driving force generated may vary in steps, or a dead zone may appear in which no driving force is generated even if the driver depresses the accelerator pedal, resulting in deterioration of the driveability.

Thus, according to the Pa-Gx relationship used in the vehicle control system 1 of the embodiment, the minimum generable acceleration Gxmin is determined as the minimum acceleration Gx0 applied to the vehicle when the idling turns from ON to OFF in the case where the set minimum acceleration Gx0' at the time of switching of the idling from ON to OFF is different from the minimum generable acceleration Gxmin. Accordingly, even in the case where the minimum acceleration Gx0 applied when the idling turns from ON to OFF is set to the set minimum acceleration Gx0' that is larger than the minimum generable acceleration Gxmin (Gxmin <Gx0), as indicated by the one-dot chain line in FIG. 9, or where the minimum acceleration Gx0 applied when the idling turns from ON to OFF is set to the set minimum acceleration Gx0' that is smaller than the minimum generable acceleration Gxmin (Gxmin >Gx0), as indicated by the two-dot chain line in FIG. 10, the minimum generable acceleration Gxmin is determined as the minimum acceleration Gx0 applied to the vehicle when the idling turns from ON to OFF (Gxmin =Gx0), as indicated by the solid line in FIG. 10. As a result, when the accelerator pedal stroke Pa changes from Pa0 indicative of the fully released position of the accelerator pedal to a value other than Pa0, namely, when the idling turns from ON to OFF (see FIG. 10), the minimum acceleration Gx0 is set to the minimum generable acceleration Gxmin (see FIG. 11). If Gxmin is smaller than Gx0 (Gxmin <Gx0), the required acceleration Gx is changed from Gxmin to Gx0; therefore, the throttle opening Sa responsive to the accelerator pedal stroke Pa is significantly increased from the time when the accelerator pedal is depressed, as indicated by the one-dot chain line in FIG. 12, and the driving force generated in the vehicle CA vary by large degrees or steps. Also, if Gxmin is larger than Gx0 (Gxmin >GxO), the acceleration G applied to the vehicle CA does not change until the required acceleration Gx is changed from Gx0 to Gxmin; therefore, the throttle opening Sa responsive to the accelerator pedal stroke Pa does not change for a while after the accelerator pedal is depressed, as indicated by the two-dot chain line in FIG. 12, and a dead zone appears in which no driving force is generated in the vehicle CA, However, when Gxmin =Gx0, the required acceleration Gx is equal to Gxmin immediately after the accelerator pedal is depressed; therefore, the throttle opening Sa responsive to the accelerator pedal stroke Pa immediately after the accelerator pedal is depressed falls in the range between the one-dot chain line for the case where Gxmin <Gx0 and the two-dot chain line for the case where Gxmin >Gx0, and driving force can be generated in the vehicle CA immediately after the accelerator pedal is depressed. Thus, the continuity of the driving force when the accelerator pedal is depressed (ON) from the released position (OFF) can be ensured, and the acceleration G applied to the vehicle CA changes continuously, thus achieving smooth starting or re-accelerating of the vehicle CA. Also, since the minimum acceleration Gx0 is set to the minimum generable acceleration Gxmin when the idling turns from ON to OFF, it is possible to reduce variations in the acceleration G, which would be caused by a change of the required acceleration Gx based on a change of the minimum acceleration Gx0 in a condition where the accelerator pedal stroke Pa is constant, for example, during the accelerating operation by the driver.

Also, the Pa-Gx relationship used in the vehicle control system 1 according to the embodiment is changed while maintaining given characteristics, based on the acceleration that can be generated by the engine 4 and T/M 5 as the acceleration generating device, in this embodiment, based on the minimum generable acceleration Gxmin. It is thus possible to achieve smooth starting or re-accelerating of the vehicle CA, while sufficiently establishing an acceleration that meets the sensibility of the driver, and to reduce or eliminate a difference between the required acceleration Gx and the acceleration generated, thus suppressing deterioration of the driveability.

While the Pa-Gx relationship includes the maximum generable acceleration Gxmax as a condition in the above-described embodiment, the invention is not limited to this, but the maximum generable acceleration Gxmax may not provide a condition of the Pa-Gx relationship. Namely, the required acceleration Gx may be calculated based on the WF exponential function, throughout the entire range of the accelerator pedal stroke Pa. In this case, it is preferable to design the v-G relationship at a given accelerating operation amount; as a condition of the Pa-Gx relationship, so that the required acceleration Gx corresponding to the maximum accelerator pedal stroke Pamax is close to the maximum generable acceleration Gxmax.

While the running resistance is taken into consideration when the required driving force Fo is calculated in the above-described embodiment, the running resistance may not be taken into consideration. While the acceleration generating device is comprised of the engine 4 and the T/M 5 in the above-described embodiment, the acceleration generating device is not limited to this arrangement, but may be comprised of a motor as a driving power source, and a power transmitting mechanism capable of converting motor torque as the output of the motor. When the T/M 5 has a lock-up clutch, the lock-up clutch also constitutes the acceleration generating device. This is because the engine torque T produced by the engine 4 and transmitted to the downstream side of the lock-up clutch changes depending on a clutch condition of the lock-up clutch, and the acceleration G applied to the vehicle CA changes accordingly.

As described above, the vehicle control system and the vehicle control method are useful for determining a required value corresponding to an acceleration applied to the vehicle, based on the accelerating operation amount representing the operation of the accelerator pedal by the driver, and the vehicle speed of the vehicle. In particular, the vehicle control system and vehicle control method are suitable for sufficiently achieve an acceleration that meets or agrees with the sensibility of the driver, by determining the optimum target acceleration for the driver's accelerating operation amount.

The invention claimed is:

1. A vehicle control system comprising:
    an acceleration generating device that generates an acceleration applied to a vehicle; and
    a vehicle control device that controls the acceleration generating device, based on an accelerating operation amount representing an operation of an accelerator pedal by a driver, and a vehicle speed of the vehicle, wherein
    the vehicle control device controls the acceleration generating device, based on a required value which is determined based on a relationship between the accelerating operation amount and the acceleration, and the relationship includes, as a condition, an acceleration corresponding to a given accelerating operation amount, which is specified by a relationship between the vehicle speed and the acceleration when the acceleration operating amount is held at the given accelerating operation amount;
    the relationship between the accelerating operation amount and the acceleration includes, as a further condition, a minimum acceleration as an acceleration applied to the vehicle;
    the vehicle control device is configured to (i) set the minimum acceleration equal to a first minimum acceleration when an idling switch is ON, the first minimum acceleration being determined based on a predetermined relationship between acceleration and vehicle speed, (ii) when the idling switch turns from ON to OFF, set the minimum acceleration equal to a second minimum acceleration that is determined in a manner different from the first minimum acceleration, the second minimum acceleration being continuously calculated by responding to an increase of the vehicle speed and based on an electrical load of parts mounted in the vehicle, the electrical load being of any one of an alternator and an air conditioner, the electrical load changing continuously during running of the vehicle, and (iii) as long the idling switch remains OFF, set the minimum acceleration equal to the second minimum acceleration; and
    the parts mounted in the vehicle include the alternator or the air conditioner.

2. The vehicle control system according to claim 1, wherein the second minimum acceleration applied when the idling turns from ON to OFF is a minimum generable acceleration as the acceleration that can be generated by the acceleration generating device when the idling turns from ON to OFF.

3. The vehicle control system according to claim 2, wherein the first minimum acceleration applied to the vehicle when the idling is ON is determined according to the vehicle speed.

4. The vehicle control system according to claim 1, wherein when the accelerating operation amount is in a region that is larger than at least the given accelerating operation amount, the relationship between the accelerating operation amount and the acceleration includes, as a further condition, a maximum generable acceleration as the acceleration that can be generated by the acceleration generating device when the accelerating operation amount is equal to a maximum value.

5. The vehicle control system according to claim 4, wherein the required value at the time when the accelerating operation amount is equal to the maximum value corresponds to the maximum generable acceleration.

6. A vehicle control system comprising:
    an acceleration generating device that generates an acceleration applied to a vehicle; and
    a vehicle control device that controls the acceleration generating device, based on an accelerating operation amount representing an operation of an accelerator pedal by a driver, and a vehicle speed of the vehicle, wherein
    the vehicle control device controls the acceleration generating device, based on a relationship between the accelerating operation amount and the acceleration, the relationship being a combination of:
        a first line that is indicative of a relationship between the accelerating operation amount and the acceleration, the first line including an acceleration corresponding to a given accelerating operation amount, which is specified by a relationship between the vehicle speed and the acceleration when the accelerating operation amount is held at the given accelerating operation amount, and
        a second line that is indicative of a relationship between the accelerating operation amount and the acceleration, the second line including a maximum generable acceleration as the acceleration that can be generated by the acceleration generating device when the accelerating operation amount is equal to a maximum value;
    the relationship between the accelerating operation amount and the acceleration includes, as a further condition, a minimum acceleration as an acceleration applied to the vehicle;
    the vehicle control device is configured to (i) set a minimum acceleration equal to a first minimum acceleration when an idling switch is ON, (ii) when the idling switch turns from ON to OFF, set the minimum acceleration equal to a second minimum acceleration different from the first minimum acceleration, the second minimum acceleration being continuously determined by responding to an increase of the vehicle speed and based on an electrical load of parts mounted in the vehicle, the electrical load being of any one of an alternator and an air conditioner, the electrical load changing continuously during running of the vehicle, and (iii) as long the idling switch remains OFF, set the minimum acceleration equal to the second minimum acceleration; and
    the parts mounted in the vehicle include the alternator or the air conditioner.

7. A vehicle control method for controlling an acceleration generating device that generates an acceleration applied to a vehicle, based on an accelerating operation amount representing an operation of an accelerator pedal by a driver, and a vehicle speed of the vehicle, the method comprising:

controlling the acceleration generating device based on a required value which is determined based on a relationship between the accelerating operation amount and the acceleration, and the relationship includes, as a condition, an acceleration corresponding to a given accelerating operation amount, which is specified by a relationship between the vehicle speed and the acceleration when the accelerating operation amount is held at the given accelerating operation amount, and the relationship between the accelerating operation amount and the acceleration includes, as a further condition, a minimum acceleration as an acceleration applied to the vehicle, wherein (i) the minimum acceleration is set equal to a first minimum acceleration when an idling switch is ON, (ii) when the idling switch turns from ON to OFF, the minimum acceleration is set equal to a second minimum acceleration different from the first minimum acceleration, the second minimum acceleration being continuously determined by responding to an increase of the vehicle speed and based on an electrical load of parts mounted in the vehicle, the electrical load being of any one of an alternator and an air conditioner, the electrical load changing continuously during running of the vehicle, and (iii) as long the idling switch remains OFF, the minimum acceleration is set equal to the second minimum acceleration, wherein the parts mounted in the vehicle include the alternator or the air conditioner.

* * * * *